United States Patent [19]

Vandenburgh

[11] Patent Number: 4,859,865
[45] Date of Patent: Aug. 22, 1989

[54] TAMPER RESISTANT RADON DETECTOR SYSTEM

[76] Inventor: Herman H. Vandenburgh, 22 Chapin Rd., Barrington, R.I. 02806

[21] Appl. No.: 75,521

[22] Filed: Jul. 20, 1987

[51] Int. Cl.$^4$ .............................................. G01V 5/00
[52] U.S. Cl. ..................................... 250/253; 250/255
[58] Field of Search ................. 250/253, 255; 340/779

[56] References Cited

U.S. PATENT DOCUMENTS 3,169,188 2/1965 Horner et al. ......................... 357/73
3,426,197 2/1969 Waly et al. ........................... 250/392
4,700,070 10/1987 Kovac ................................. 250/472.1

Primary Examiner—Craig E. Church
Assistant Examiner—Richard Hanig
Attorney, Agent, or Firm—Robert J. Doherty

[57] ABSTRACT

A radon detection system which enables accurate and certifiably tamper proof results to be achieved while positioned in an unattended test site environment over an extended time period. Such system includes a radon monitoring device mounted with a housing and appropriately provided with a series of external and internal sensors to determine whether any attempt has been made during the test period to invalidate or tamper with the results.

5 Claims, 1 Drawing Sheet

TAMPER RESISTANT RADON DETECTOR SYSTEM

BACKGROUND AND OBJECTS OF THE INVENTION

This invention relates to radon detection and more specifically to a system whereby radon level readings may be accurately and reliably obtained within the test site of a structure without the need for direct supervision during the test.

Radon is a colorless, odorless, radioactive gas, which like other radioactive elements, decays or changes into smaller particles termed progeny which, if inhaled either directly or when attached to dust particles or the like, may emit radioactivity directly into one's lung and thus cause cancer. It is, accordingly, important to determine the radon level present in one's house so that steps can be taken to alleviate or eliminate the problem, if it exists. Normally, radon seeps into the basement of the house or other structure through the supporting ground or from water contained therein. Thus the normal test method for determining radon level in such a structure is to place a radon detector, normally the activated charcoal type, in the basement and to permit such to be bombarded by the ambient air for a time period generally between three and seven days. The test is started by removing a closure member from the charcoal canister and terminated by replacing such member to seal the container after the test. Other methods and devices currently utilized for testing radon and its decay products in buildings include continuous radon monitors, alpha-track detectors, grab sampling devices, and radon progeny integrating sampling units. Procedures and references for these various methods can be found in numerous U.S.E.P.A. publications, e.g., EPA 520/1/-86-03 entitled "Implementation Strategy for the Radon/Radon Progeny Measurement Proficiency Evaluation and Quality Assurance Program." Another information source in non-technical terms is that article entitled "Radon Detectors" Pages 440 through 447 of *Consumer Reports*, July 1987.

While these above-indicated detection systems are adequate within their technical limitations, they are inappropriate for legally sensitive radon tests, e.g., real estate transactions, because they are subject to tampering by interested parties. Thus, the importance of determining the radon level of a home planning to be purchased prior to completing such transaction is being recognized by an increasing number of lenders and purchasers. Accordingly, sales contracts may require a radon test to be done on the premises while the would be seller is still occupying the house. Generally such a contract would require that a test result below a certain radon level, normally expressed in picocuries of radiation per liter of air, be obtained. Since most such tests must be conducted over time to be accurate because the particular radon level may dramatically change over time, it is impractical for the tester or the purchaser's agent to be present over such lengthy time periods, say three to seven days. Accordingly, there is a need to provide a system in which the more practical methods of radon air analysis for house testing, i.e., charcoal canister or radon progeny integrating sampling units, can be conducted in a tamper-proof collection procedure which allows the test results to be guaranteed as true and accurate and free from tampering such that the test results can be contractually relied upon.

Accordingly, the primary object of the present invention is the provision of a system embodied in an easily transportable device which can monitor radon levels in a building when left unattended for days or weeks in a tamper-proof manner. These and other objects of the present invention are accomplished by a radon detector system for accurately measuring the radon level within a finite test site of a structure over a period of time without direct supervision by the tester comprising a portable fully enclosed housing having a lockable access cover and means for attaching said housing to a fixed member of said structure within said test site, said housing having a radon monitoring device in turn including an air accepting portion thereof disposed externally of said housing and both external and internal detection means for detecting various possible modes of tampering with said radon monitoring device and/or the test site in which such is disposed, said external detection means including: (a) first motion detection means for detecting the presence of a moving object adjacent said housing, and (b) test site air environment detection means for detecting a change in the air proximal to the housing, said internal detection means including: (a) second motion detection means for detecting movement of the housing, (b) means for detecting the interruption of electrical power to the housing, and (c) means for detecting removal or dislodging of said air accepting portion of said monitoring device.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DETAILED DESCRIPTION OF THE INVENTION

Figure 1:
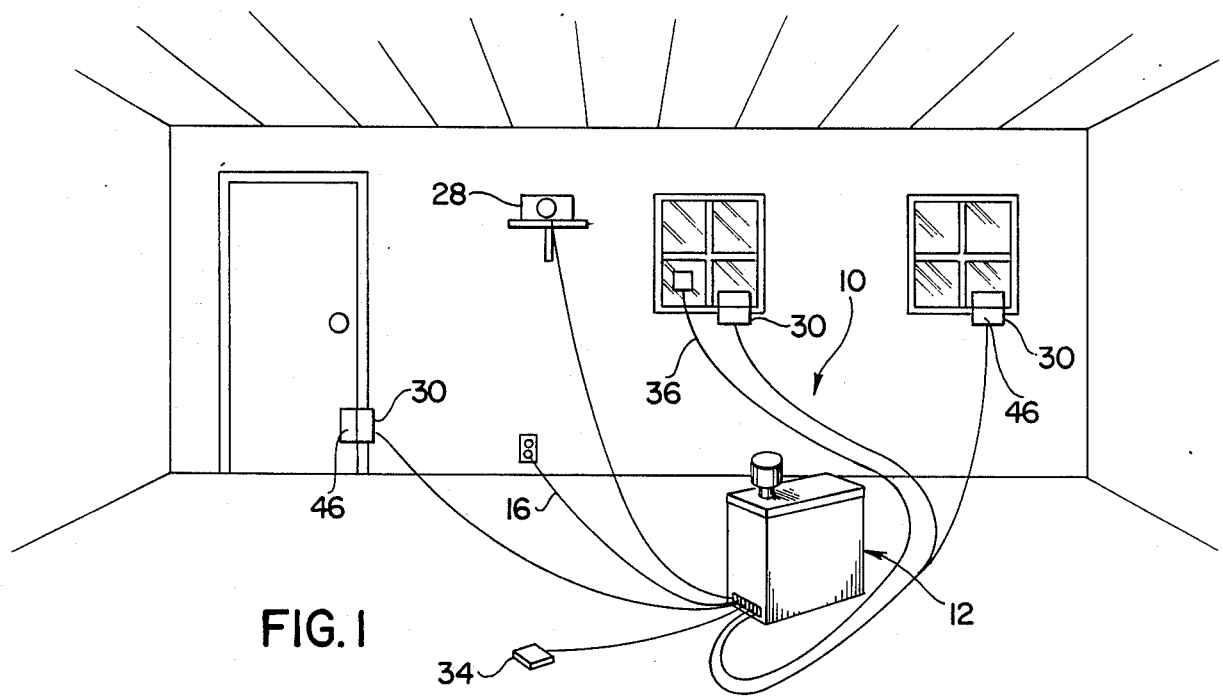
FIG. 1 is a stylized version of the portable unit of the present system positioned in a house basement in use position.
Figure 2:
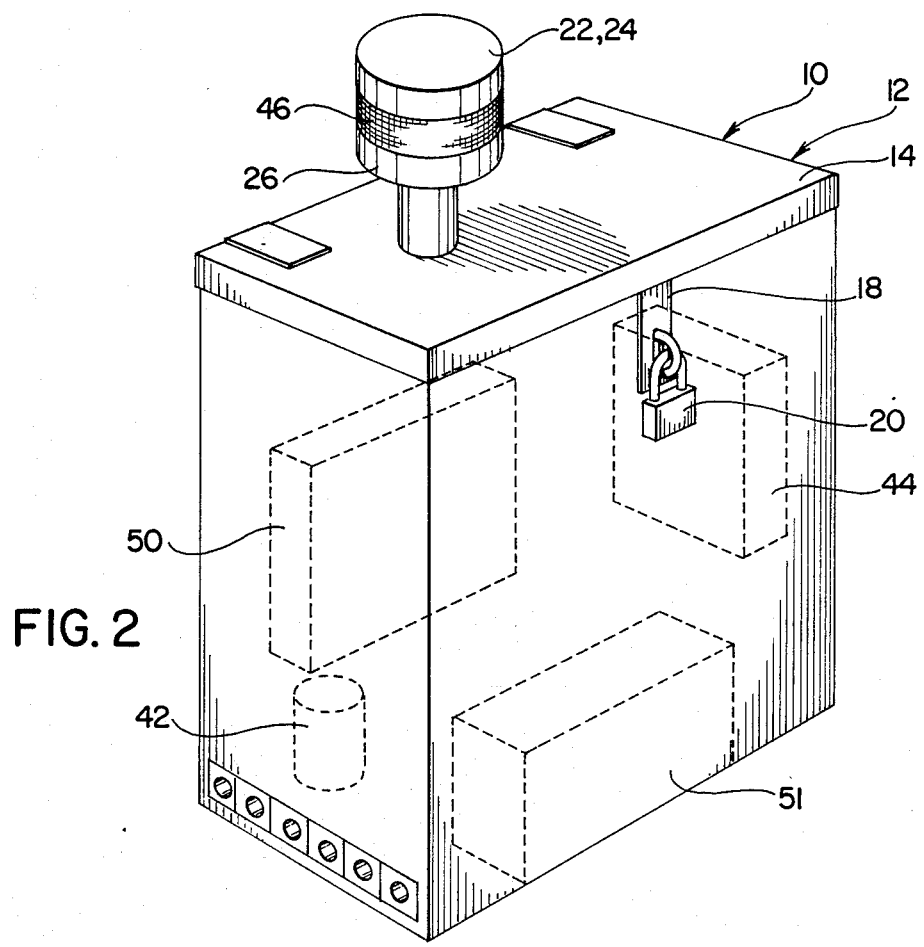
FIG. 2 is an enlarged somewhat stylized view showing the positioning of the various test equipment and devices within the portable housing.

With present radon test equipment, the test results can be altered to lower radon level readings than actually exist in the building by several methods including: (a) disconnecting the building's electrical power to prevent a radon detector's air pump from collecting the sample; (b) ventilating the building with outside air which has a low radon level thus diluting the overall concentration in the building; (c) moving the radon test equipment outside during sample collection, and (d) covering or interfering with free air flow to the radon collection device. The present invention is a system of a combination of appropriately housed electronic and environmental sensors coupled with the radon/radon progeny detector which will detect any attempt to alter the test results by any of the above-indicated methods.

The system 10 of the present invention includes a housing 12, i.e., a steel or strong plastic instrument box with a secure lockable top 14. The housing can be chained or otherwise fixedly attached to an immovable object such as a structural support column or water pipe in the subject building. The system of the lockable top and chain is such that any attempt to force entry into the housing will be evident to the tester. The housing is placed in a central location in the closed building, usually the basement, and an activating electrical power cord 16 connected to the building's electrical system. The means by which the top 14 can be secured to the remainder of the housing can be by a conventional hasp 18 secured by a lock 20 or other appropriate known means.

The housing 12 includes a radon detector which may be either a charcoal canister 22 or a radon progeny integrating sampling unit 24, either device, or a portion thereof, of which is adapted to be mounted on a receptor 26 projecting upwardly from the housing top or in any other appropriate location. The charcoal canister-type detector 22 may be the type having a generally cylindrical body mounted on the receptor 26 which includes a cylindrical body portion adapted to the canister dimensions such that tamper-resistant tape can be run around their adjacent side walls to secure the canister to the housing. In regard to the radon progeny integrating sampling devices, such include an air accepting head that may also be taped in a similar manner to the receptor 26. In other words, the system is adapted to use either of these aforementioned radon collection procedures. Although sometimes this requires duplicate or unused equipment to be in the housing, such adds to the system's flexibility and desirability. Besides the detection unit 22, the system includes a series of external and internal detection means. Such external detection means include a motion detection means 28, test site entry detection means 30 which in its simplest form is tamper-resistant tape applied to the doors and windows leading to the test site, a test site air environment detection means for detecting a change in the air proximal to the housing location within the test site either in the form of temperature sensors 34 and 36 respectively, or alternatively the inclusion of an air flow sensor 40 positioned within the test site.

Charcoal canister radon detectors are well known and may be obtained from many sources such as those listed in the *Consumer Reports*' reference. Radon progeny integrating sampling devices are also well known, one such device obtainable from RAD Services, Ltd., Scarborough, Ontario, Canada is identified as Surveymeter Model M-1. The motion detector 28 may be a passive infrared motion sensor obtainable from Radio Shack, Catalogue No. 49-530. A suitable tamper-resistant tape is tamper-resistant tape obtainable from Lab Safety Supply, Janesville, Wisconsin. The temperature sensors 34 and 36 may be of the ambient air sensor type and are obtainable from Rodco Products Co., Inc., Columbus, Nebraska. A suitable air flow sensor is that identified as the Kurz Portable Air Velocity Meter, Model # 1440-4 and obtainable from Davis Instrument Manufacturing Co., Inc., Baltimore, Maryland.

In addition to the radon monitoring devices above mentioned and the external detection means, a plurality of internal detection means is provided as well. Such internal detection means include a tamper switch 42 for detecting housing movement itself, a circuit interruption detection means 44 for detecting the interruption of electrical power to the housing, and means for detecting removal or dislodging of the air accepting portion of the radon monitoring device normally in the form of tamper-resistant tape 46 by which either of said devices 22 or 24 is attached to the intake unit 26.

The tamper switch 42 may be of the push button type obtainable as Model #49-528 from Radio Shack. The circuit interruption detection means 44 may be of the digital electronic memory type and further identified as Computemp 5 from Rodco Products Co., Inc., Columbus Nebraska.

The incorporation of such external and internal detection means in appropriate combinations within the housing 12 of the present system 10 enables the system to function in a manner that prevents tampering or otherwise invalidating or interfering with the test procedures by the above outlined common methods available to the unscrupulous homeowner. The operation and manner of conducting the test procedures utilizing the system 10 of the present invention will hereinafter be explained.

The motion detector 28 is placed 15 to 25 feet from the housing 12 in such a manner to detect any approach to the equipment. Often the motion detector can be positioned to also cover the entry door to the test area. The motion detector is connected by a six wire cable to an alarm center control box 51 inside the housing. Such alarm control center basically is a burglar alarm security type device available as a steel unit box with LED indicators which performs as an alarm center for external sensors (e.g., vibration, motion, glass breakage), key locks, and alarm bells, lights, sirens, etc. Such a device is available from Radio Shack, Catalogue No. 49-450. The motion detector 28 contains a red LED which lights when motion has been detected in the area covered by the detector. This can be used by the analyst (tester) to adjust the field of coverage for optimal performance. The motion detector has a tamper switch which activates the alarm control center if anyone moves the detector or attempts to take off the cover to inactivate the motion detector.

A further procedure is setting up the radon system of the present invention is to place the outside temperature sensor 36 from the side of the housing through one of the building's windows to monitor the outside temperature during the test. This sensor 36 is connected to the housing or instrument box by a suitable length cord. Also coming out of the housing side is a second temperature sensor 34 on a short, i.e., six inch, line monitoring the building's inside temperature during the test. Both sensors are connected to a commercially available computerized temperature recorder such as a Computemp 5 (Rodco Products Co., Inc.) which is positioned inside the housing. The temperature recorder 50 is cleared by the analyst at the start of the test period and then activated to begin recording. The computer memory stores the high and low temperature readings each sensor measures during the radon test period and the time of day at which each of these temperatures occurred. The purpose of recording this information is that basement temperatures in most buildings are fairly constant, falling between 55° to 60° F., while outside temperatures fluctuate widely during the day and night. If proper test conditions have been maintained during the radon procedure, the indoor and outdoor temperature measurements recorded should reflect such when the analyst returns to collect the equipment. If the analyst finds on checking the values that the high and low temperatures and times of occurrence match or are quite similar for indoor and outdoor measurements, there is a good chance that outside air, low in radon levels, has somehow been pumped into the closed test area. The test would therefore be invalidated. Anyone attempting to tamper with the test would not have access to this temperature information unless they break into the housing. These sensors are a redundancy system which would be important if the entry sensors as will hereinafter be explained and the system's motion detector lines of defense have been defeated in a manner undetectable by the analyst.

In this regard, it should be pointed out that air flow sensors located in the closed building could be used in the place of or in addition to the temperature sensors. These would determine whether abnormal air flow, indicative of outside air being forced into the test area, occurred during the test. Temperature sensors are generally used in the system because they are more sensitive and less expensive than air flow sensors.

After completing the second line of equipment defense, i.e., motion detection, and installing temperature sensors, the analyst proceeds to connect remote entry sensors to each opening in the closed area in which the test is to conducted. Usually magnetic contact switches of normally open configuration are installed on the doors and mini shock/vibration sensors on the closed windows. Both magnetic contact switches and mini shock/vibration sensors are readily available from home security sources. Since most radon tests are performed in basements having windows which tilt open from the top or bottom, the mini shock/vibration sensors are usually set in a normally open configuration such that the contacts close and activate the alarm control center if a window has been opened. Other entry sensor types are compatible with the system and can be used, if needed, with the equipment. The entry sensors are normally taped to the doors, windows, etc. with tamper-resistant tape. Attempting to remove the entry sensors would tear the tape, be visible to the analyst on his return, and invalidate the test results. The sensors are connected to the system in the housing via rapid plug-in bullet connectors projecting through the housing. Each sensor is checked for proper operation upon installation by observing a green LED outside the housing which remains lit when the sensor contacts are open but goes off when the contacts are closed.

Once all window and door sensors are installed and tested, the remainder of the closed building area is carefully checked for small openings, e.g., fireplace openings, pipes, small holes, through which outside air might be pumped. These openings are carefully and securely sealed with plastic sheeting, duct tape, and tamper-resistant tape and their locations noted on a system report. These coverings are carefully examined at the conclusion of the test to insure their integrity. If they are no longer intact, the test is invalidated. The second line of defense is now in place. The perimeter defense purpose is two-fold: (1) to detect any unauthorized entry during the test, and (2) to determine whether windows and/or doors have been opened during the test to allow the entry of low radon-containing outside air.

The housing itself has several tamper sensors if the first line of defense (entry sensors), second line of defense (motion detectors), and third line of defense (tamper-resistant tape) have been defeated in a manner that is undetectable by the analyst when he returns to collect the equipment. The first detector sensor is a tamper switch on the housing bottom which immediately activates the alarm control center if anyone attempts to move or cover the box, e.g., with a plastic bag. Finally, the instrument's arm/disarm key switch, located outside the instrument box, has a tamper switch on its cover 14.

With all sensors in position, the radon test begins. The analyst inserts the radon sensor in the radon progeny integrating sampling unit or removes the tape cover from a charcoal canister to collect the radon/radon progeny. Tamper-resistant tape is placed around the radon detector in a manner, as previously described, such that the detector cannot be removed from the instrument box without breaking the tape. The analyst now activates a digital LED timer inside the housing to measure the elapsed time of the radon test. A coded number, known only to the analyst, is programmed into the digital timer and noted on his report. If ever during the test there is a power interruption to the test equipment, the coded number is lost from the timer's memory. If the coded number is not present on the timer when checked by the analyst on his return to collect the equipment, the test is invalidated. The housing top is now securely locked.

If a flowmeter, located outside the instrument box and connected to the air pump of the radon progeny integrating sampling unit, is used, it is checked and the flow rate recorded in the report. The analyst activates the alarm control center with a key at the external arm/disarm switch. There are two LEDs on this switch. The green LED, when lit, indicates to the analyst that all the entry sensors and motion detectors are functioning properly. The red LED, when lit, indicates the system has been activated. The alarm control center may have a 45 second, or other appropriate entry/exit, delay to allow time for the analyst to make his exit before the system is armed. The analyst exits the test area and may place a large sign on the exit/entry door(s): "AUTHORIZED PERSONNEL ONLY! DO NOT ENTER" and "In Case of Emergency, contact . . . ." The door is sealed with tamper-resistant tape.

The housing may have a 120 decibel interior alarm on its side. If any of the alarm control center sensors are activated during the test period, this alarm will sound for five minutes and then reset. This indicates to anyone in the house that the test is no longer valid, and the analyst should be called to reset the equipment.

When the analyst returns to collect the system equipment, he or she first checks and then removes the tamper-resistant tape and sign from the entry door. The analyst then opens the door and goes immediately to the housing. The analyst checks the status of the two external LEDs on the arm/disarm switch. If the green LED is blinking the red LED is on but not blinking, the analyst knows the system has been activated by the analyst's own entry a few seconds before and not by anyone else. If the green LED is not blinking or is off, it indicates there is a sensor disconnected or the power is turned off. The test is invalidated. If both green and red LEDs are blinking, it indicates someone other than the analyst has entered the test area during the test, and the test is invalidated.

If the test looks acceptable based on the LED light status, the analyst inactivates the alarm control center with a key, unlocks the housing top, notes the time the test has run on the LED timer, and checks to see if the coded number is still in the timer's memory. If it is no longer present, it indicates there has been a power interruption during the test, and the test is invalidated. If all looks acceptable to this point, the indoor and outdoor high and low temperatures are checked and the time of occurrence for each recorded on the report. If the temperature values do not appear as they should, the test is invalidated. The analyst next carefully checks all the entry detectors and sealed areas to verify the sensors and the tamper-resistant tapes are intact. If all test requirements are met, the radon detector is returned to the laboratory for analysis, and the results thereafter certified as accurate.

Accordingly, it is seen that an unique, flexible, easily operable, and generally low cost system has been provided to accomplish the overall objects of the present invention.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A radon detector system for accurately measuring the radon level within a finite test site of a structure over a period of time without direct supervision by the tester comprising, a portable fully enclosed housing having a lockable access cover and means for attaching said housing to a fixed member of said structure within said test site, said housing having a radon monitoring device in turn including an air accepting portion thereof disposed externally of said housing and both external and internal detection means for detecting various possible modes of tampering with said radon monitoring device and/or the test site in which such is disposed, said external detection means including:
(a) motion detection means for detecting the presence of a moving object adjacent said housing, and
(b) test site air environment detection means for detecting a change in the air proximal to the housing, said internal detection means including:
(a) tamper switch means for detecting movement of the housing,
(b) means for detecting the interruption of electrical power to the housing, and
(c) means for detecting removal or dislodging of said air accepting portion of said monitoring device.

2. The system of claim 1 wherein said external detection means includes sensor means for detecting the opening of entry closures including doors and/or windows to the test site.

3. The system of claim 1, wherein said internal detection means including means for recording the temperatures of the air proximal to the housing.

4. The system of claim 3, said internal detection means including means for recording the temperature of both the test site air and the air outside the structure and said external test site air environment detection means comprising temperature sensors positioned in said test site and outside said structure.

5. The system of claim 1, said external test site air environment detection means being an air flow sensor positioned in said test site.

* * * * *